United States Patent [19]

Mizuno et al.

[11] Patent Number: 4,956,594
[45] Date of Patent: Sep. 11, 1990

[54] METHOD OF CONTROLLING A ROBOT IN ACCORDANCE WITH LOAD CONDITIONS

[75] Inventors: Toru Mizuno, Tama; Haruyuki Ishikawa, Shinjuku; Takashi Iwamoto, Oshino, all of Japan

[73] Assignee: Fanuc Ltd., Minamitsuru, Japan

[21] Appl. No.: 332,934

[22] PCT Filed: Sep. 17, 1988

[86] PCT No.: PCT/JP88/00948

§ 371 Date: Mar. 23, 1989

§ 102(e) Date: Mar. 23, 1989

[87] PCT Pub. No.: WO89/02624

PCT Pub. Date: Mar. 23, 1989

[30] Foreign Application Priority Data

Sep. 19, 1987 [JP] Japan .................. 62-233638

[51] Int. Cl.$^5$ .............................................. G05B 19/42
[52] U.S. Cl. ............................ 318/568.1; 318/568.22; 318/632; 901/9; 364/513
[58] Field of Search ............... 318/568.1, 568.22, 632; 901/9; 364/513

[56] References Cited

U.S. PATENT DOCUMENTS 4,860,215  8/1989  Seraji ..................................... 364/513
4,873,476 10/1989  Kurakabe et al. .............. 318/568.22

Primary Examiner—William M. Shoop, Jr.
Assistant Examiner—Saul M. Bergmann
Attorney, Agent, or Firm—Staas & Halsey

[57] ABSTRACT

A robot control method for enabling a robot effectuate various operations, having load conditions which differ from one another, in accordance with optimum control conditions.

A load condition, including the sum (W) of the weight of a robot hand and the weight of a workpiece, a distance (L) from the center point of the joint of the robot hand to the center of gravity of the hand and the workpiece, and a combined inertia (J) of the robot hand and the workpiece, is set for each of the robot operations and stored together with a group number indicating the load condition. To operate the robot, load condition commands, which are written in a program along with operation commands include a load condition control code and a group number. The control conditions are determined on the basis of the load conditions corresponding to the group numbers. The robot operations are then performed in accordance with the control conditions thus determined.

10 Claims, 2 Drawing Sheets

K1, K2 : PROPORTIONAL GAIN
K3     : INTEGRATING GAIN
α      : DIFFERENTIATING GAIN

| GROUP NO. | SEQUENCE NO. | CONTENTS OF ITEM |
|---|---|---|
| 1 | 0 | W : WEIGHT OF HAND + WEIGHT OF WORK |
| 1 | 1 | L : OFFSET VALUE |
| 1 | 2 | J : INERTIA |
| 1 | 3 | SPARE |
| 2 | 4 | W |
| 2 | 5 | L |
| 2 | 6 | J |
| 2 | 7 | SPARE |
| 3 | 8 | W |
| 3 | 9 | L |

T

K1, K2 : PROPORTIONAL GAIN
K3 : INTEGRATING GAIN
α : DIFFERENTIATING GAIN

METHOD OF CONTROLLING A ROBOT IN ACCORDANCE WITH LOAD CONDITIONS

BACKGROUND OF THE INVENTION (a) Field of the Invention

The present invention relates to a robot control method capable of making a robot effect various operations in accordance with optimum control conditions.

(b) Description of the Related Art

In a conventional robot having servomotors for actuating various axes of the robot and servo systems for driving the servomotors, the response characteristics of the servo systems to their respective inputs and the servo gains for determining control conditions of the robot, e.g., gains in the proportional, integrating and differentiating elements involved in the servo systems, are set such that the response characteristics of the servo systems may be optimum when maximum load is applied on the servomotors. Thus, the conventional robot is controlled in accordance with control conditions which are unchangeable.

Meanwhile, the robot is required to make various operations, and the load applied on the servomotors of the robot varies depending on kinds of the operations of the robot. Therefore, if the control conditions of the robot are determined so as to be best suited to the maximum load, as mentioned above, excessive driving force can be supplied to the servomotors in ordinary states (i.e., when the maximum load is not applied on the robot). The tendency is particularly conspicuous in the case of a direct drive type robot. Thus, in the conventional robot, the response characteristics of the servo systems and, in turn, the control conditions of the robot are not in conformity to load conditions other than the maximum load condition. As a result, disadvantages arise, for example, in that the outputs of the servo systems overshoot the inputs thereto and oscillate, which causes vibration of the robot.

SUMMARY OF THE INVENTION

The object of the invention is to provide a robot control method capable of making a robot effect various operations, which require different load conditions, in accordance with optimum control conditions.

To achieve the above-mentioned object, the robot control method according to the invention comprises the steps of: (a) setting and storing beforehand load conditions for various operations of the robot; (b) reading a program including operation commands for instructing a series of operations to be made by the robot and load condition commands each representing a load condition of a corresponding operation in the series of operations and described in relation to the corresponding operation; (c) reading one of the load conditions stored in the step (a) which corresponds to a read-out load condition command when the load condition commands are individually read from the program in the step (b), and determining a desired control condition on the basis of the load condition thus read out; and (d) controlling the drive of the robot in accordance with the desired control condition determined in the step (c).

An advantage of the present invention is that, since the robot is controlled according to an optimum control condition based on the load condition which is set for an operation to be executed by the robot, no excessive driving force is supplied to the servomotors which actuate the individual axes of the robot, and vibration of the robot is prevented, whereby the robot can be controlled under the most desirable conditions.

DESCRIPTION OF THE PREFERRED EMBODIMENT

Figure 1:
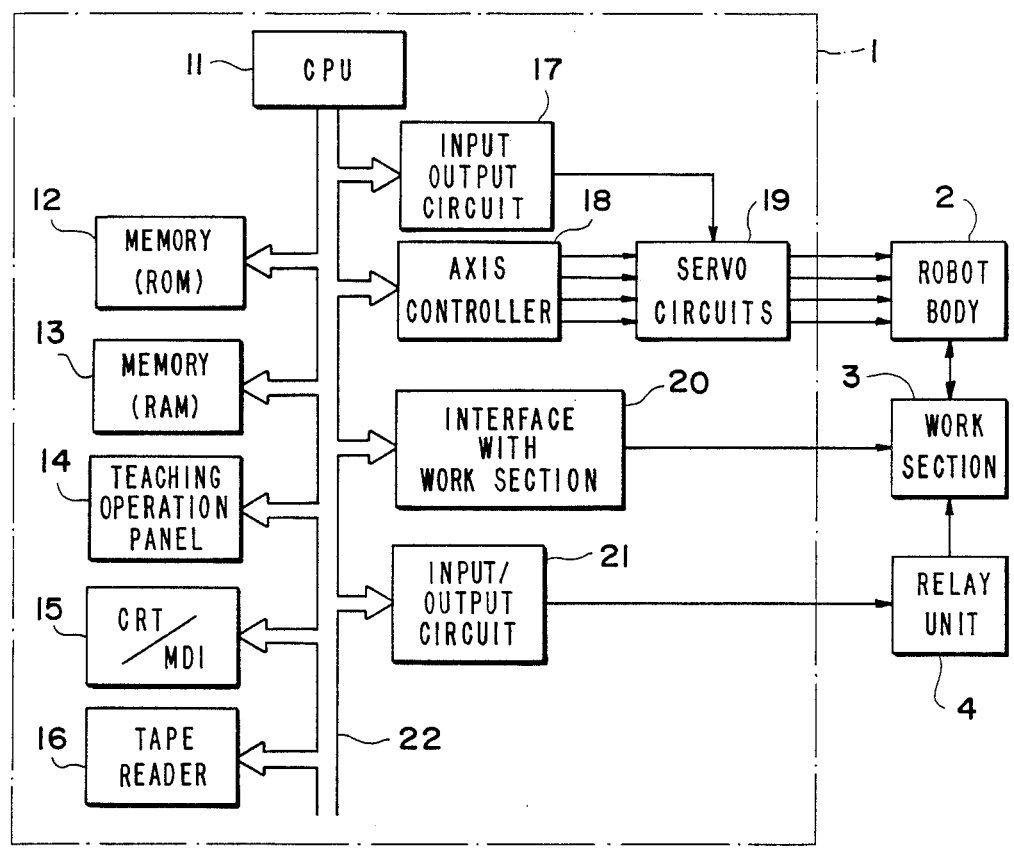
FIG. 1 is a block diagram schematically illustrating a robot and its peripheral elements to which a robot control method according to one embodiment of the invention is applied.

Referring to FIG. 1, reference numeral 1 denotes a numerical control system serving as a control system for controlling a robot, 2 denotes a body of the robot, 3 denotes a work section on which the robot body 2 works, and 4 denotes a relay unit for controlling the drive of the work section 3.

The numerical control system 1 includes a central processing unit (hereinafter referred to as the "CPU") 11. Connected to the CPU 11 are a memory 12 comprising a ROM, a memory 13 comprising a RAM, a teaching operation panel 14, an operation panel 15 with a CRT display unit (hereinafter referred to as the "CRT/MDI"), and a tape reader 16.

The memory 12 stores various control programs which are executed by the CPU 11. The memory 13 stores teaching programs which are input from the teaching operation panel 14, the CRT/MDI 15, the tape reader 16 or the like load condition data which is input from the tape reader 16 or the like, and, as described hereinafter, the results of the calculations performed by the CPU 11 as well as any and other necessary data. The teaching operation panel 14 includes a numerical display unit, lamps and operation buttons which are necessary for the operation of the robot. The CRT/MDI 15 comprises, in addition to a display unit including a CRT, various keys such as numeral keys and function keys so that an operator can input load condition data and other various data to the numerical control system 1. Reference numeral 18 denotes an axis controller including an interpolator for controlling a plurality of axes of the robot, 19 denotes servo circuits for controlling the actuators of the robot body 2, and 21 denotes an input/output circuit for supplying and receiving signals to and from the work section 3 via the relay unit 4. Reference numeral 17 denotes another input/output circuit for setting various gains of the servo circuit 19, 20 denotes an interface with the work section 3, and 22 denotes a bus. The servo circuits 19 are is of a software servo type each including a CPU and a RAM, though not illustrated in detail in the figure, and each is connected via a shared RAM composed of a part of the memory 13 and the input/output circuit 17 to the CPU 11 for data transfer therebetween. Servo gains set by the CPU 11 for the respective robot axes are written in the shared RAM, as described hereinafter, and the thus written servo gain data is transferred to the RAM of the servo circuits 19 by the CPU of the same circuit.

The operation of the robot of the present embodiment will be explained below.

Figures 2, 3:
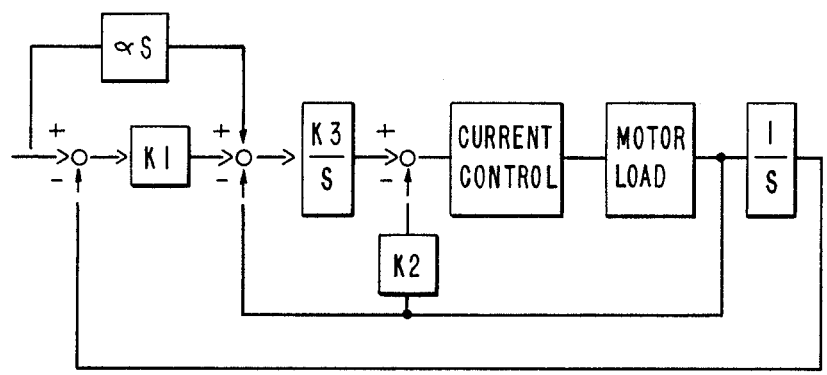
FIG. 2 is a diagram showing a load condition table used in the method of the present invention.
FIG. 3 is a block diagram showing the internal arrangement of a servo circuit in FIG. 1 in terms of transfer functions.

Before preparing a teaching program for teaching the robot operations to be executed, the operator operates the CRT/MDI 15 to set the numerical control system 1 in a load condition setting mode. Then, in order to set load conditions according to various operations of the robot, the operator makes a load condition table T, as shown in FIG. 2, in the memory 13.

According to this embodiment, a load condition relating to one operation of the robot is set using a group of items which correspond to a series of four sequence numbers. For example, the group of items includes the sum W of a weight of the robot hand and the weight of the workpiece, an offset value L representing the distance from the center point of the joint of the robot hand (i.e., the center of rotation of the hand) to the center of gravity of the hand and the workpiece, and a combined inertia J of the hand and the workpiece which are input and stored in memory areas of memory 13 corresponding to sequence numbers "0" to "2" of group number "1". In this manner, a first load condition is set and stored.

The memory area corresponding to the sequence number "3" is a spare area and used for setting a necessary item other than weight W, offset value L and inertia J.

Similarly, load conditions associated with various operations of the robot are stored in respective groups of memory areas, each group, for example including four memory areas with a series of four sequence numbers, e.g., 4–7, 8–11, 12–15, 16–19, and 20–23. Thus, a load condition (W, L, J) is set for each of the various operations of the robot, in accordance with presence or absence of the hand, presence or absence of the workpiece, types of the hand and the workpiece, etc. in each of the robot operations.

After setting the load conditions in this manner, the operator operates the CRT/MDI 15 to place the CRT/MDI 15 in a load condition-setting menu display mode in which load conditions (W, L, J) are displayed in association with corresponding operations of the robot. When programming (teaching) operation commands for instructing a series of operations to be made executed by the robot, the operator also programs (teaches) commands representing the load conditions which are suited to the respective robot operations by referring to the various load conditions displayed on the CRT. Each of the load condition commands includes a control code indicating that this command is an instruction (statement) relating to a load condition, e.g., "S63", a register number (operand) associated with the load condition, e.g., "29", and a group number indicating a particular load condition to be selected for the robot operation called for by the operation command. Thus, the load conditions for the various robot operations are programmed using these load condition commands.

Suppose that a command of $$S63\ 29,\ 1 \qquad (1)$$

is programmed. In the robot operation associated with a block including the command (1), the load condition corresponding to the group number "1" is selected.

The CPU 11 determines control conditions, such as servo gains for the respective axes of the robot, on the basis of the selected load condition (W, L, J) the relationship between load conditions, which are experimentally obtained beforehand, and control conditions which respectively matching these load conditions. The control conditions thus determined are stored in the shared RAM of the memory 13. The CPU of the servo circuit 19 then transfers the control condition data stored in the shared RAM to the RAM of the servo circuits 19 via the input/output circuit 17.

In this manner, proportional gains K1 and K2 and an integral gain K3 of the servo circuits 19, illustrated in FIG. 3, are varied in accordance with the load conditions. More specifically, the gains are increased with an increase in the load.

Moreover, when a control condition is calculated for one a particular load condition, the control condition may be stored in memory so that if the same load condition later selected, the stored control condition can be output without having to calculate the control condition again.

The many features and advantages of the invention are apparent from the detailed specification and thus it is intended by the appended claims to cover all such features and advantages of the invention which fall within the true spirit and scope thereof. Further, since numerous modifications and changes will readily occur to those skilled in the art, it is not desired to limit the invention to the exact construction and operation illustrated and described, and accordingly all suitable modifications and equivalents may be resorted to, falling within the scope of the invention.

What we claim is:

1. A method of controlling a robot in accordance with load conditions, comprising the steps of:
   (a) storing beforehand load conditions for various operations of the robot;
   (b) reading a program including operation commands, for instructing a series of operations to be executed by the robot, and load condition commands, each representing a load condition for a corresponding operation in the series of operations;
   (c) reading one of the load conditions stored in step (a) corresponding to a load condition command individually read from the program in step (b), and determining a desired control condition based on the load condition read; and
   (d) controlling the robot in accordance with the desired control condition determined in step (c).

2. A method according to claim 1, wherein said robot comprises servomotors for actuating axes of the robot, and servo systems for driving the servomotors.

3. A method according to claim 2, wherein the control condition comprises response characteristics of the servo systems.

4. A method according to claim 2, wherein the control condition comprises at least one of proportional, integral and differential gains of each of the servo systems.

5. A method according to claim 1, wherein the load condition comprises a sum of a weight of a robot hand and a weight of a workpiece, a distance from the center point of a joint of the robot hand to the center of gravity of the robot hand and the workpiece, and a combined inertia of the robot hand and the workpiece.

6. A method according to claim 1,
   wherein said storing in step (a) stores each of the load conditions together with a number identifying the load condition, and
   wherein each of the load condition commands includes a control code, indicating the command relates to load conditions, and the number.

7. A method according to claim 2, wherein said storing in step (a) stores each of the load conditions together with a number identifying the load condition, and wherein each of the load condition commands includes a control code, indicating the command relates to load conditions, and the number.

8. A method according to claim 3, wherein said storing in step (a) stores each of the load conditions together with a number identifying the load condition, and wherein each of the load condition commands includes a control code, indicating the command relates to load conditions, and the number.

9. A method according to claim 4, wherein said storing in step (a) stores each of the load conditions together with a number identifying the load condition, and wherein each of the load condition commands includes a control code, indicating the command relates to load conditions, and the number.

10. A method according to claim 5, wherein said storing in step (a) stores each of the load conditions together with a number identifying the load condition, and wherein each of the load condition commands includes a control code, indicating the command relates to load conditions, and the number.

* * * * *

UNITED STATES PATENT AND TRADEMARK OFFICE
CERTIFICATE OF CORRECTION

PATENT NO. : 4,956,594
DATED : September 11, 1990
INVENTOR(S) : Mizuno et al.

It is certified that error appears in the above-identified patent and that said Letters Patent is hereby corrected as shown below:

ON THE TITLE PAGE
In the ABSTRACT, line 1, before "effectuate"
         insert --to--.

In the ABSTRACT, line 5, should not start a new paragraph.

Col. 2, line 53, "circuit 19" should be
         --circuits 19--.

Col. 3, line 26, "example" should be --example,--.

Col. 3, line 40, delete "made".

Col. 3, line 62, after "J)" insert --,--.

Col. 4, line 11, before "later" insert --is--.

Signed and Sealed this

Seventeenth Day of March, 1992

*Attest:*

HARRY F. MANBECK, JR.

*Attesting Officer*     *Commissioner of Patents and Trademarks*